W. L. WALTON.
TRANSMISSION CONTROLLING DEVICE FOR TRACTORS.
APPLICATION FILED JULY 7, 1913.
1,125,226.
Patented Jan. 19, 1915.
4 SHEETS—SHEET 4.
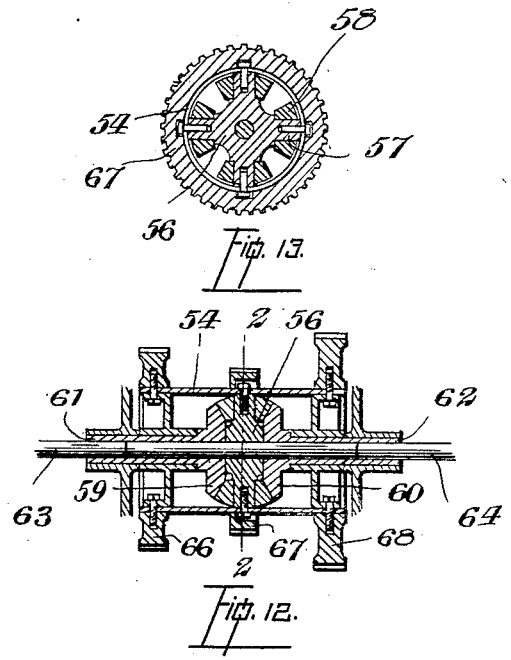
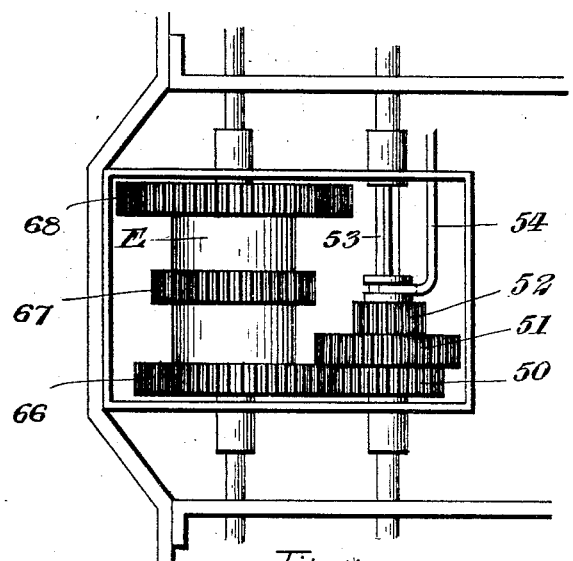
INVENTOR
W. L. WALTON

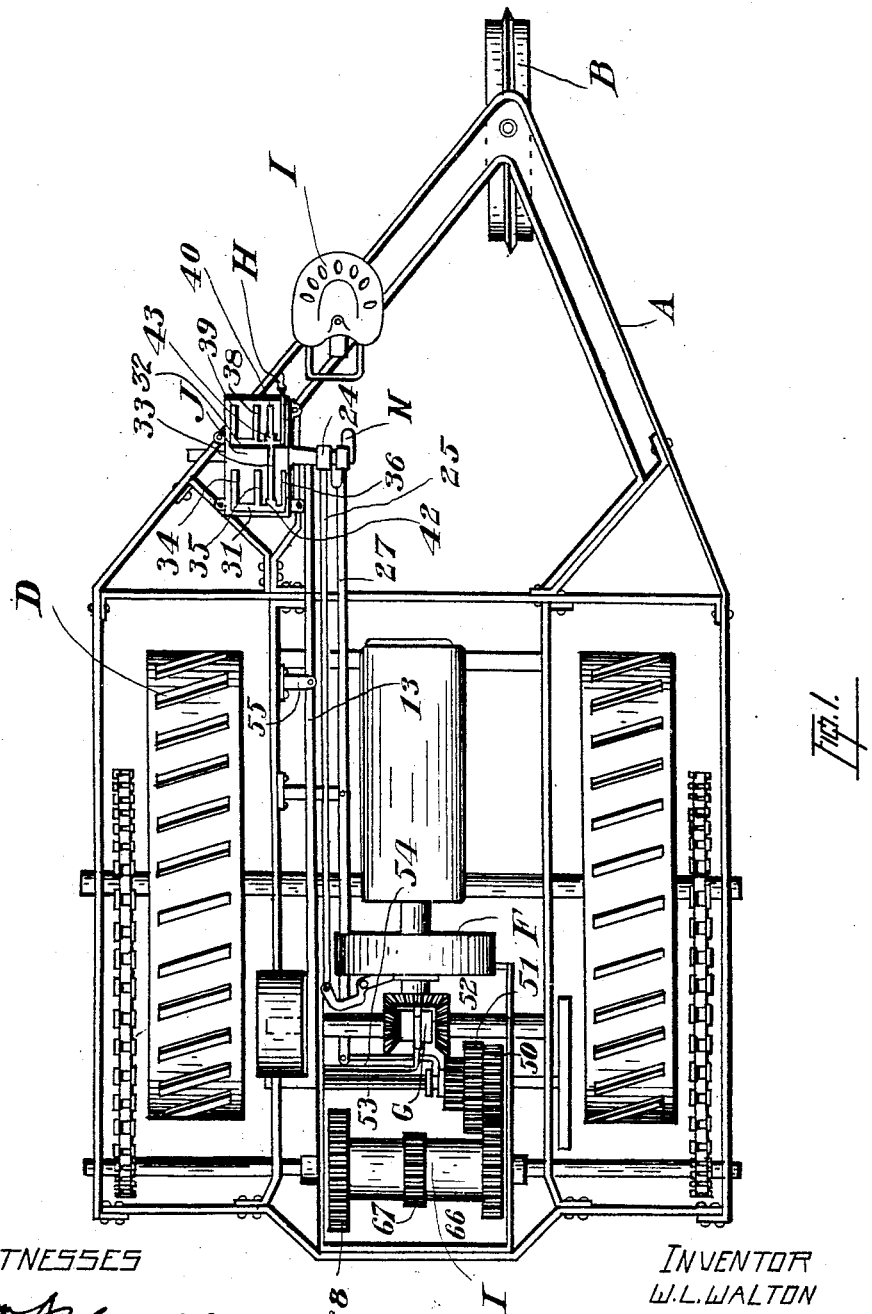

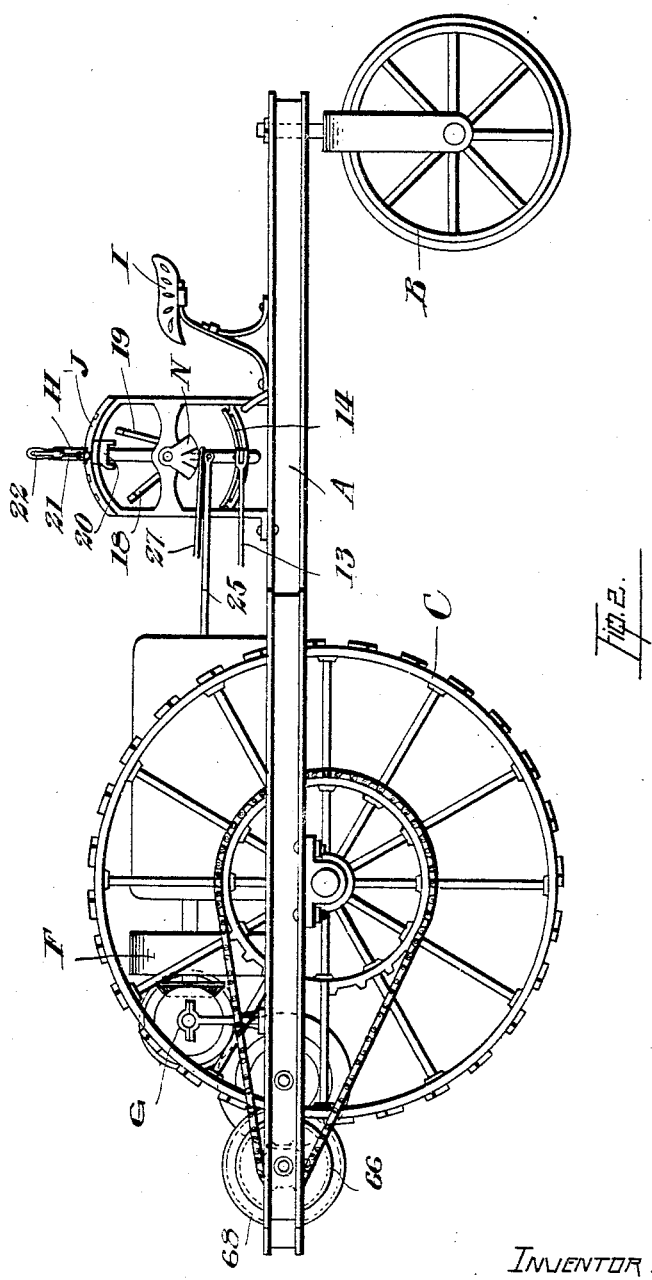

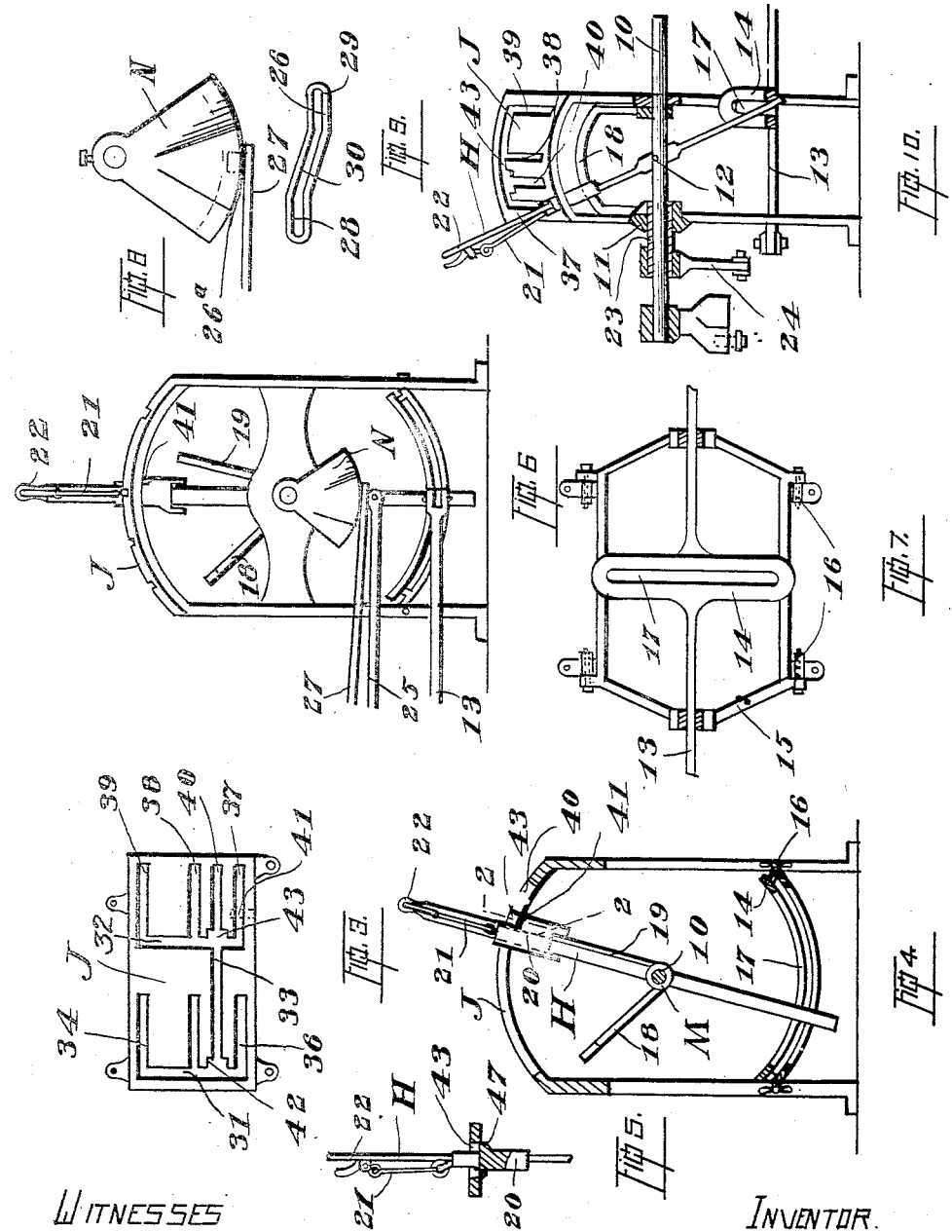

UNITED STATES PATENT OFFICE.

WILLIAM L. WALTON, OF BANTRY, NORTH DAKOTA.

TRANSMISSION-CONTROLLING DEVICE FOR TRACTORS.

1,125,226.  Specification of Letters Patent.  Patented Jan. 19, 1915.

Application filed July 7, 1913. Serial No. 777,775.

*To all whom it may concern:*

Be it known that I, WILLIAM L. WALTON, a citizen of the United States, and resident of Bantry, in the State of North Dakota, in the United States of America, have invented certain new and useful Improvements in Transmission-Controlling Devices for Tractors, of which the following is a specification.

This invention relates to improvements in transmission controlling device, for tractors, and the objects of the invention are to enable the gear shift, clutch and the reversing mechanism of a motor plow or other tractor to be all controlled from a single lever.

Further objects are to provide safe-guards whereby it will be impossible to change or reverse the gears without releasing the clutch.

Further objects still are to generally improve and simplify the construction and better adapt the working parts to perform the function required of them, and it consists essentially of the improved construction hereinafter described in detail in the accompanying specification and drawings.

In the drawings, Figure 1 is a plan view of the tractor embodying the present invention. Fig. 2 is a side view of the same. Fig. 3 is a plan view of the lever control plate. Fig. 4 is a sectional elevation of the lever and control plate. Fig. 5 is a section on the line 2—2, Fig. 4. Fig. 6 is an end elevation of the lever and controlling mechanism actuated thereby. Fig. 7 is a plan view of the gear shift plate. Fig. 8 is a side view of the reversing cam. Fig. 9 is a plan of the under face of the reversing cam. Fig. 10 is a side sectional elevation of the lever and control plate. Fig. 11 is a plan view of the variable speed gearing. Fig. 12 is a sectional view through the differential gearing. Fig. 13 is a section on the line 2—2, Fig. 12.

In the drawings like characters of reference indicate corresponding parts in all the figures.

Referring to the drawings, A represents the frame of the tractor having steering wheel B, and traction wheels C and D of usual construction.

E represents the transmission gearing as a whole, details of which will be hereinafter more fully described.

F represents the clutch and G the reversing gearing.

H represents the single controlling lever, mounted adjacent to the driver's seat I. In accordance with the present invention the lever H is pivotally secured to a shaft 10 so that the lever may be swung from side to side without turning the shaft, the shaft itself being suitably journaled in a frame 11. It will be seen that the lever may be swung from side to side in one direction about its pivoted point 12 without turning the shaft. It may also be turned in a direction at right angles when it will turn the shaft.

The lever H extends through a control plate J which is curved so that it is concentric with the shaft 12 and is supported from, and as illustrated, may form part of the frame 11. The movement of the lever H is caused to control the transmission gearing with the clutch and the reverse gearing by different instrumentalities.

The transmission gearing is controlled through the means of a sway bar 13 which is connected to a gear shift plate 14. The sway bar 13 is supported and steadied by housing 15 which also supports gear shift plate 14, the said housing being supported from the frame 11 with freedom of vertical adjustment, which may be accomplished by connecting it to the frame by bolt and slot connections 16. The object of this adjustment is to vary the amount of throw or slide given to the gears. The gear shift plate 14 is also curved to be concentric with the shaft 10 and is provided with a slot 17 extending transversely of the shaft so that when the lever is moved in a direction at right angles to the axis of the shaft no movement of the gear shift plate will take place and the plate will only be moved when the lever is swung about the pivot 12.

The lever H controls the clutch through the medium of a yoke M mounted loosely on the shaft and formed with two radial arms 18 and 19, either one of which is adapted to be engaged by a sliding dog 20 mounted on the lever and connected by a link 21 with the hand lever 22 pivoted near the top of the lever H. The top of each of the arms 18 and 19 are curved concentrically with the plate J so that the lever may be moved from side to side about the pivoting point 12 while the dog 20 will slide on either one of the arms 18 and 19 and not operate the clutch.

The yoke M is connected to a sleeve 23 which extends through the frame 11 which carries a crank 24 which is connected to the clutch rod 25.

The reversing gearing is adapted to be controlled through the means of an arcuate cam member N carried on the shaft 10 and having a groove 26 formed on its face adapted to be engaged by a roller 26ª carried on the end of the sway bar 27 which controls the reversing clutch. The cam groove 26 is formed with two straight portions 28 and 29 connected by an inclined portion 30, the straight portions being at right angles to the shaft. In this way the sway bar will be only moved to reverse the gearing during the time the roller is moving through the inclined part 30.

The lever control plate J is formed with two main transverse slots 31 and 32 connected by what may be termed a reversing slot 33. The transverse slot 31 is formed with gear shift slots 34, 35 and 36 which extend at right angles therefrom and the slot 32 is formed with like gear shift slots 37, 38 and 39, and also with a slot 40 which is used when the tractor is used to operate other machinery from the belt pulley mounted on a reverse gearing shaft. It will be seen that by drawing the lever back into this slot 40 the belt pulley is operated in one direction with none of the traction gearing in mesh while if the lever dog is raised and is carried forward to 42 and dropped through plate J so as to hook onto lever 18 and then drawn back as far into slot 33 as it can come the clutch will be set to drive the belt pulley in the reverse direction.

The dog 20 on the controlling lever is formed with a projecting plate 41 somewhat wider than any of the slots in the plate J and this plate will normally slide beneath the under surface of the plate J and the plate 41 of the dog is only adapted to be raised above the plate J when the lever is at one end or the other of the reversing slot 33, the plate J being formed with enlarged slots 42 and 43 at these points, which permit passage of the dog.

Referring now to Figs. 11, 12 and 13 for a description of the transmission gearing, 50, 51 and 52 represent three sliding gears of various sizes which are connected together and slidably mounted on the shaft 53, being adapted to be adjusted in position by means of a link 54 which connects them with the sway bar 13, said sway bar being pivoted intermediate of its length with a bracket 55. 56 represents a compensating gearing contained within the cylindrical drum 54, said compensating gearing being formed with four radial arms 57 on which beveled pinions 58 are rotatably mounted, the extremities of the arms being connected to the drum 54 and the pinions meshing with beveled gears 59 and 60 which rotate with sleeves 61 and 62, the sleeves being connected to the shafts 63 and 64 which drive the traction wheels. 66, 67 and 68 are relatively large wheels mounted on the drums 54 and spaced a distance apart, either one of which is adapted to be engaged with one of the gears 51, 52 and 53 by means of which the different speeds are secured.

The clutch F may be of any ordinary or usual construction as may also the reversing gearing G, consequently it is not thought necessary to describe them in detail herein.

In operation the invention works as follows: Assuming that the lever is in the position shown in Fig. 1 with the clutch set and the tractor traveling forward, the lever is then at the end of the slot 37. If the lever is pushed forwardly until it meets the end of the slot 32 the clutch through the yoke M and crank 24 and rod 25 will be released. If the lever is then swung to the right to the slot 40 one gear will be slid out of mesh. If it is swung further to the slot 38, the next gear goes into mesh, and if the lever is drawn back in the slot 38 the clutch will be set. If it is pushed forwardly again the clutch will be released again. If the lever is swung to the slot 39 the third gear will be brought into mesh. To reverse, the lever is brought into the position in which the dog 20 may lift through the slot 43. The dog is lifted so that it disengages from the arm 19 of the yoke M and the plate 41 is caused to slide on top of the plate J while the lever passes through the slot 33. The movement of the lever into the slot will, through the arcuate member N and inclined portion 30 of the cam groove, cause the sway bar controlling the reversing gear to be swung and the reversing mechanism to be operated. When the slot 42 is reached the dog is lowered to its usual position and engaged with the arm 18 of the yoke M. The lever may then be moved into either one of the slots 34, 35 and 36, in each of which a different gear will be thrown in thus providing for three speeds in the reverse direction.

It will thus be seen that the invention provides for three speeds in a forward direction, three speeds in the reverse direction, operation of the clutch and the reversing mechanism, all from one lever.

As many changes could be made in the above construction and many apparently widely different embodiments of my invention within the scope of the claims, constructed without departing from the spirit or scope thereof, it is intended that all matter contained in the accompanying specification shall be interpreted as illustrative and not in a limiting sense.

What I claim as my invention is:—

1. A controlling device for tractors comprising gear changing mechanism, a clutch, reversing gearing, a controlling lever mounted with freedom to move in two directions, mechanism operated by a movement of the lever in one direction for actuating the clutch and reversing gearing and mechanism operated by movement of the lever in the other direction for operating the gear changing mechanism.

2. A controlling device for tractors comprising gear changing mechanism, a clutch, reversing gearing, a controlling lever mounted with freedom to move in two directions, mechanism operated by a movement of the lever in one direction for actuating the clutch and reversing gearing and mechanism operated by movement of the lever in the other direction for operating the gear changing mechanism, a lever control plate having slots by which operation of the gear changing mechanism is prevented until the clutch has been released.

3. A controlling device for tractors comprising a shaft, a lever pivoted to the shaft, a clutch, mechanism for controlling the clutch by turning of the lever with the shaft, transmission gearing, means for shifting the transmission gearing operated by swinging of the lever about its pivoted points.

4. A controlling device for tractors comprising a shaft, a lever pivoted to the shaft, a yoke on the shaft, detachable connecting means between the yoke and the lever, a clutch operated by movement of the yoke, and transmission gearing controlled by swinging of the lever about its pivoting point.

5. A controlling device for tractors comprising a shaft, a lever pivoted to the shaft, a yoke on the shaft, detachable connecting means between the yoke and the lever, a clutch operated by movement of the yoke, and transmission gearing controlled by swinging of the lever about its pivoting point and reversing gearing controlled by turning of the shaft.

6. A controlling device for tractors comprising a shaft, a lever pivoted to the shaft, a lever control plate having slots in which the lever operates, a yoke mounted on the shaft, detachable connecting means between the yoke and the lever, a clutch operated by movement of the yoke, a cam member carried by the shaft, reversing gearing controlled by the cam member, a gear shift plate having a slot through which the lever extends, said plate being adapted to move with the lever when moved in the opposite direction from that in which the yoke moves.

7. A controlling device for tractors comprising a lever mounted with freedom to move in two directions, a yoke adapted to move with the lever in one direction, a clutch operated by the yoke, a gear shift plate having a slot through which the lever extends, said plate being adapted to move with the lever when moved in the opposite direction from that in which the yoke moves.

8. A controlling device for tractors comprising a shaft, a lever pivoted to the shaft, a lever control plate formed with slots through which the lever is adapted to extend, a yoke mounted on the shaft having arms whose surfaces are curved with a radius from the pivoting point of the lever, a dog forming a detachable connection between the lever and said arms, and gear shifting mechanism operated by turning of the lever with the shaft.

9. A controlling device for tractors comprising a shaft, a lever pivoted to the shaft, reversing mechanism operated by turning of the shaft, a clutch, a yoke mounted on the shaft and operatively connected to the clutch, a dog for releasably connecting the lever with the yoke, gear shifting mechanism operated by swinging of the lever about its pivoting point, a lever control plate formed with slots through which the lever extends, said slots being so arranged that the gear shifting mechanism cannot be actuated until the lever is moved to the position which releases the clutch.

10. A controlling device for tractors comprising a shaft, a lever pivoted to the shaft, reversing mechanism operated by turning of the shaft, a clutch, a yoke mounted on the shaft and operatively connected to the clutch, a dog for releasably connecting the lever with the yoke, gear shifting mechanism operated by swinging of the lever about its pivoting point, a lever control plate formed with slots through which the lever extends, said slots being so arranged that the gear shifting mechanism cannot be actuated until the lever is moved to the position which releases the clutch, the slots in said plate being of such width that the dog is normally held beneath the same, but said slots being formed with enlargements at two points which permit raising of the dog above the plate while the lever is moved to actuate the reversing mechanism.

11. A controlling device for tractors comprising a shaft, a lever pivoted to the shaft, transmission gearing controlled by swinging of the lever, an arcuate cam member on the shaft formed with a cam groove in its periphery, said groove being formed with two straight portions connected with an inclined portion, reversing mechanism including a roller extending in said cam groove, said mechanism being only actuated while the roller is moving through the inclined portion of the cam groove, as and for the purpose specified.

12. A controlling mechanism for tractors comprising gear changing mechanism, a clutch, reversing gearing, a controlling lever and means operatively connecting said controlling lever with said gear changing mechanism, clutch and reversing gearing, movement of said lever in one direction operating said clutch and reversing gearing and in the other direction operating said gear changing mechanism.

13. A controlling mechanism for tractors comprising transmission gearing, reversing gearing, a clutch, a controlling lever, mechanism operatively connecting the controlling lever with the transmission gearing, the clutch and the reversing gearing, the operation of said lever in one direction operating said transmission gearing and in the other direction operating said reversing gearing and said clutch and means for preventing operation of the reversing gearing until the transmission gearing is disengaged.

14. A controlling device for tractors comprising a shaft, a lever pivoted to the shaft, reversing mechanism operated by turning of the shaft, a clutch, a yoke mounted on the shaft and operatively connected to the clutch, a dog for releasably connecting the lever with the yoke, gear shifting mechanism operated by swinging of the lever about its pivoting point, a lever control plate formed with slots through which the lever extends, said slots being so arranged that the gear shifting mechanism cannot be actuated until the lever is moved to the position which releases the clutch, and an additional slot permitting operation of the reversing gearing when the clutch is disconnected.

15. A controlling device for the purpose specified comprising a gear changing mechanism, a clutch, a lever mounted with freedom to move in two directions, and operatively connected to the gear changing mechanism, means for operating the clutch adapted to be engaged and operated by the lever, a reversing mechanism connected to the lever, and a plate having slots at right angles therein and in which the lever operates.

In witness whereof I have hereunto set my hand in the presence of two witnesses.

WILLIAM L. WALTON.

Witnesses:
  H. M. WALTON,
  O. L. FOSTER.